United States Patent [19]

Otzipka et al.

[11] Patent Number: 4,802,081

[45] Date of Patent: Jan. 31, 1989

[54] ELONGATED PHONOGRAPH PICK-UP HEAD WITH SNAP-TOGETHER CONSTRUCTION

[75] Inventors: Willi Otzipka; Horst Koltermann; Michael Leipnitz; Günter Zeuge, all of Berlin, Fed. Rep. of Germany

[73] Assignee: U.S. Philips Corporation, New York, N.Y.

[21] Appl. No.: 517,120

[22] Filed: Jul. 25, 1983

[30] Foreign Application Priority Data

Jul. 29, 1982 [DE] Fed. Rep. of Germany ....... 3228300

[51] Int. Cl.⁴ ........................... G11B 3/00; G11B 3/44

[52] U.S. Cl. .................................... 369/136; 369/170; 369/172; 369/256

[58] Field of Search ............... 369/146, 170, 172, 256, 369/136, 139; 339/14 R

[56] References Cited

U.S. PATENT DOCUMENTS 3,062,925 11/1964 Pritchard ............................ 369/149
3,146,319 8/1964 Stanton ............................... 369/136
3,297,831 1/1967 Stanton ............................... 369/149
3,404,895 10/1968 Hathaway ........................... 369/256
4,031,335 6/1977 Smit .................................... 369/146
4,103,117 7/1978 Morinaga ............................ 369/146
4,174,111 11/1979 Grado ................................ 369/146
4,381,129 4/1983 Krenz ................................ 339/14 R
4,456,984 6/1984 Van Wijk ........................ 369/136 X
4,534,022 8/1985 Leipnitz ............................. 369/146

*Primary Examiner*—Raymond F. Cardillo
*Assistant Examiner*—Hoa T. Nguyen
*Attorney, Agent, or Firm*—David R. Treacy

[57] ABSTRACT

A stereo phonograph pick-up head or cutter has a slim elongated construction utilizing an elongated mount having connector pins at its rear end. Two elongated pole pieces fit into the mount, each having a socket at its rear end. Each coil is wound around a long straight pole rod whose rear end fits into a respective socket and whose front end bounds the transducing gap. A screening shell, part of which forms a common pole piece, slides lengthwise over the holder, and is glued thereto. The stylus unit is slid over the front end of the screening shell, with the stylus magnetic element sliding between the screening shell and pole pieces into the transducing gap.

11 Claims, 4 Drawing Sheets

III
III

ELONGATED PHONOGRAPH PICK-UP HEAD WITH SNAP-TOGETHER CONSTRUCTION

BACKGROUND OF THE INVENTION

The invention relates to a pick-up head and/or cutter for scanning or cutting information in a track of a rotating information-carrier disc; and more particularly to a pick-up or cutter for stereo phonograph recordings in which the information comprises signals in two orthogonal directions of oscillation. As used hereinafter the term "pick-up" should be understood to refer both to pick-up and cutting heads.

The pick-up head comprises a stylus unit with a stylus support carrying a stylus on one end, and a magnet system which directs magnetic fields and cooperates with the stylus unit. The magnetic system comprises two coils and pole pieces which each correspond to one of the two orthogonal directions of oscillation, and a third pole piece which is common to the two directions of oscillation.

Such a pick-up head is disclosed in German Auslegeschrift No. 25 12 467 to which U.S. Pat. No. 4,031,335 corresponds. The magnet system comprises two pole rods on which cylindrical coils are arranged. The ends of the pole rods which are situated within the magnetic field are U-shaped and form the two first-mentioned pole pieces. They are arranged adjacent each other opposite the third pole piece, which is formed by the screening shell. The stylus is located in the magnetic field between the two pole pieces and the third pole piece, and is mounted in an elastic suspension block. A permanent or soft-magnetic transducer element is arranged on the stylus.

In comparison with known transducers this construction is simpler owing to the use of a common third pole piece, but its weight remains comparatively high and its assembly remains comparatively intricate.

SUMMARY OF THE INVENTION

It is the object of the invention to provide a pick-up head of the type defined in the opening paragraph, which is lighter in weight because it requires less materials, which is cheaper because its assembly is simpler, and which has a more slender shape compared with known pick-up heads.

According to the invention this object is achieved in that an elongate one-piece mount, which carries the coils and is provided with connector pins at one end, is disposed inside a tubular slid-on screening shell; and the stylus unit is secured to the screening shell by means of a tubular holder sleeve which is slid onto the shell. It will be understood that, as used herein, an elongate mount is one having a length, between stylus and rear end, substantially greater than any cross-section dimension.

Such a pick-up head is low in weight, because the mass of the individual parts can be reduced substantially. Owing to the construction of the mount the screening shell can be slid onto the mount and the needle unit with its holder sleeve can be slid onto the shell. This assembly by sliding on is simple and requires less assembly time.

It is to be noted that pick-up heads comprising a mount and a screening shell are generally known, for example from German Auslegeschrift No. 19.21.927 to which U.S. Pat. No. 3,546,399 corresponds, and German Pat. No. 1,447,141. However, the known pick-up heads do not comprise a one-piece mount or they do not comprise a stylus unit with a tubular holder sleeve.

In a preferred embodiment of the invention the one-piece mount is formed from a plastic material, and a flux-return member is arranged in the plastic mount. The return member has a bent first limb which contacts the rear ends of straight pole rods on which the coils are wound, and a bent second limb which contacts the screening shell. The third pole piece, is constituted by a shell surface opposite the transducing gap ends of the pole rod which act as the pole pieces. The flux-return member is a simple sheet-metal part by which the required magnetic flux connections are established. The rear ends of the straight pole rods are in contact with the rear bent first limbs of the flux-return member. Thus, the plastic mount forms a central part which carries the pole rods with the coils, the flux-return member and the slid-on screening shell.

In a further embodiment of the invention the transducing gap ends of the pole rod cooperate with projections of the mount, so that the rear ends of the pole rods are urged against the first limbs of the flux-return member. For maintaining the correct position, in a further embodiment of the invention, the rear pole rod ends engage recesses in the first limbs of the flux-return member.

With such a construction it is important that the individual parts after they have been fitted occupy exactly the desired position relative to each other. In a further embodiment the mount is therefore provided with a stop on the connector pin side for the tubular screening shell which is slid onto the mount. This ensures that the screening shell is slid onto the mount over the required length. This length is such that when the screening shell is fully slid on, the transducing gap limbs of the flux-return member are in metallic contact with the screening shell.

In a further embodiment of the invention equipped with a carrying member, the carrying member comprises a receptacle and a stop for the mount. The complete preassembled mount, in the same way as the screening shell on the mount, can now be slid into the carrying member together with the screening shell over the required mounting depth. In this respect it is advantageous if the mount is inserted into the carrying member substantially up to the connector pins and projects axially from the carrying member. This enables the stylus unit to be slid onto the mount, that is, onto the screening shell, by means of the holder sleeve.

In a further embodiment of the invention the screening shell with the carrying member and the mount are secured to each other in the assembled position by means of an adhesive which can reach all the three parts. This can be achieved by a suitable design of the superimposed portions of the individual parts at the location of the carrying member.

An embodiment of the invention will be described in more detail, by way of example, with reference to the drawings.

BRIEF DESCRIPTION OF THE DRAWING

FIG. 1 also shows how a screening shell and a stylus holder are slid onto the mount.

DESCRIPTION OF THE PREFERRED EMBODIMENT

Figures 1, 2, 3:
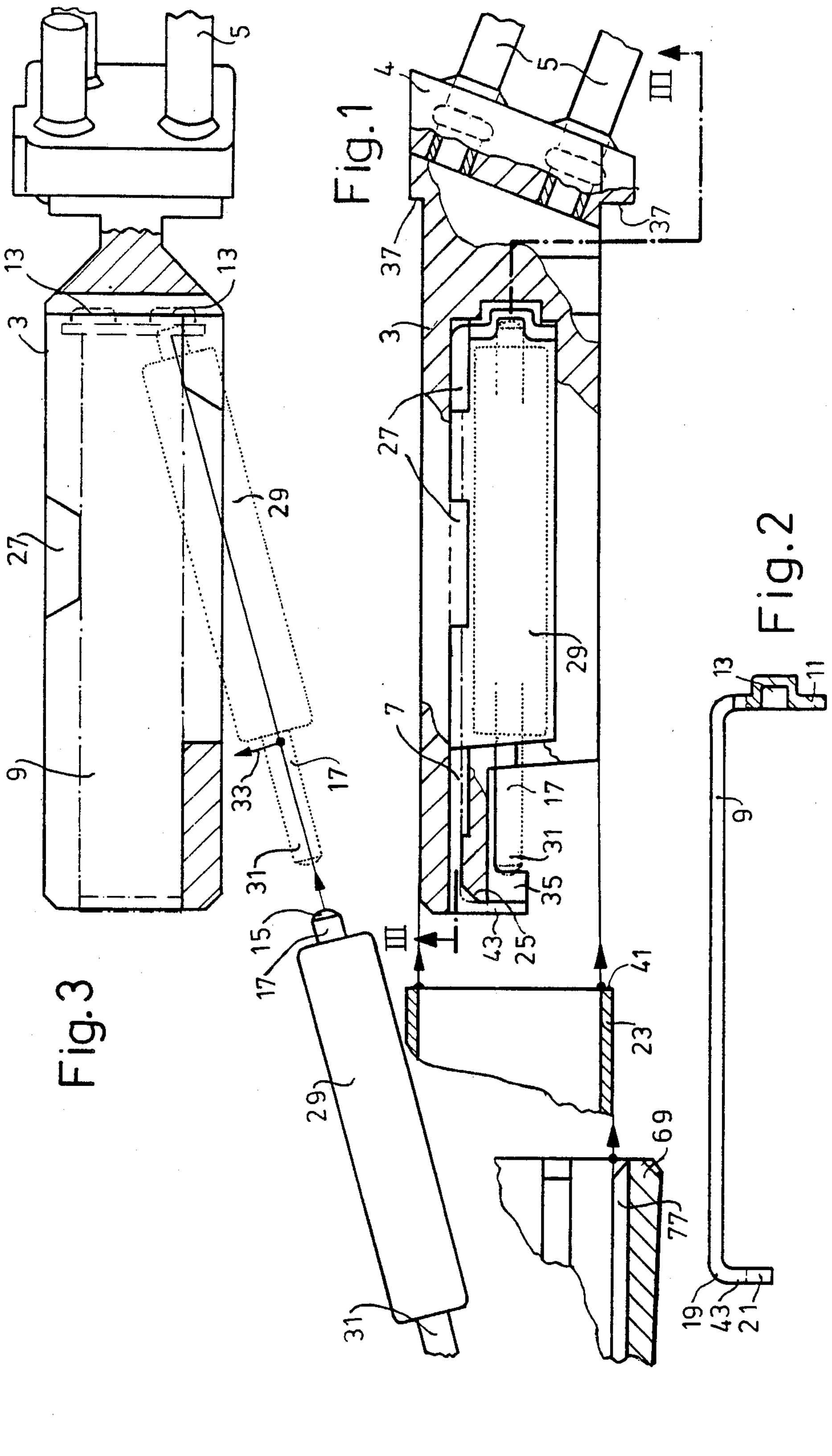
FIG. 1 is a side, partly sectional view of a mount of a pick-up head which constitutes the central part on which and around which the entire system is arranged.
FIG. 2 is a similar view of a flux-return member which transfers the magnetic flux from the rear pole-rod ends to the third pole piece.
FIG. 3 is an exploded view showing how the pole rods with the coils are inserted into the mount.

The central part of the pick-up head is formed by an elongate slender mount 3. The mount 3 is an injection-molded plastic part in whose base 4 four connector pins 5 are molded. The mount 3 is constructed so that the magnet system of the pick-up head with the scanning stylus can be fitted into and around it. The mount 3 is formed with a guide slot 7 into which a flux-return member 9 as shown in FIG. 3 can be fitted. The flux-return member may for example be a mu-metal part.

The rear bent limb 11 of the flux-return member 9 shown in FIG. 2 has recesses 13 for engagement with the rear ends 15 of pole rods 17. At the transducing gap end 19 the flux-return member 9 also has a bent limb 21, by means of which the contact with a screening shell 23 (FIGS. 1 and 4) is established, as will be explained hereinafter.

The flux-return member 9 shown in FIG. 2 is fitted into the guide slot 7 in the position relative to the mount 3 as shown in FIG. 1, by moving the member from a location above the plane of drawing into this plane. After this the member 9 is shifted to the right in the guide slot 7 until it abuts with a stop 25 of the mount 3 in the dash-dot position (FIG. 1). The flux-return member 9 is prevented from dropping sideways out of the mount by edge portions 27.

When the member 9 is in the position shown in FIG. 2 the pole rods 17 with their coils 29 are fitted into the mount 3. The pole rods 17 are straight mu-metal rods without flanges, on which the coils 27 are arranged. In FIG. 3 the position of the member 9 in the mount 3 is again indicated by a dash-dot line. The rear ends 15 of pole rods 17 are fitted into the recess 13. Subsequently, the transducing gap ends 31 of the pole rods 17 are fitted into the mount in the direction indicated by an arrow 33. The gap ends 31 then come into contact with oblique faces 35 on the mount 3 and are pressed into the recesses 13. After having passed the oblique face 35 the ends 31 of the pole rods 17 snap behind the oblique face 35, so that the rods 17 are fixed to the mount.

The connecting wires of the coils 29 may now be fitted into the connector pins 5 and soldered to these pins.

Pre-assembly of the mount 3 is now completed, and the mount carries the flux-return member 9, the pole rods 17 and the coils 29. As shown in FIG. 1 a square tubular screening shell 23 is then slid onto the elongate mount 3. The shell comprises a profile-rolled strip of a suitable screening metal. The shell can be slid on until it abuts with stop surfaces 37 on the base 39 of the mount 3. The end position is clearly visible in FIG. 4. When the front edge 41 of the screening shell 23 abuts with the stops 37, the front edge surface 43 of the flux-return member 9 also comes into metallic contact with a front bounding wall 45 of the shell 23.

Figure 4:
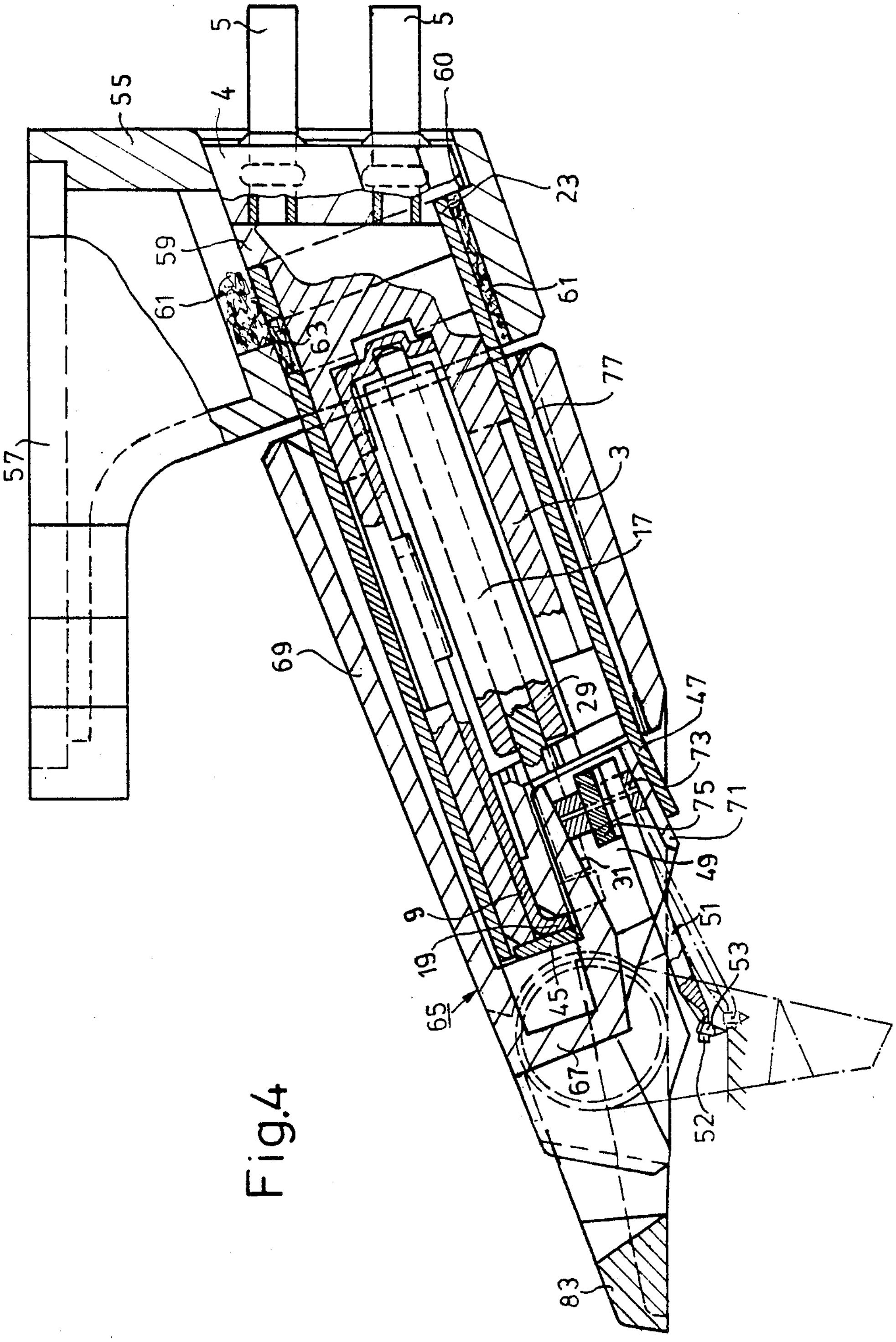
FIG. 4 is a sectional view of the pick-up head after assembly of the parts.

FIG. 4 also shows that after the shell 23 has been slid onto the pre-assembled mount 3, a screening-shell surface 47 which forms the third pole piece faces the transducing gap ends 31 of the pole rods 17. The gap ends 31 of the pole rods 17 form two pole pieces, which each correspond to one of two orthogonal directions of oscillation. Thus, an electromagnetic energizing field may be formed in the transducing gap 49 in which the stylus support 51 is arranged. At its free front end 52 the suspension block 51 carries the stylus 53. The stylus and its functions are described in more detail below.

The pre-assembled mount 3 is fitted into a carrying member 55. This carrying member 55 with a standard connector base 57 is formed with a receptacle 59. The mount 3 with screening shell is slid into the receptacle 59 with its flux side. The sliding movement is limited by a stop 60 on the base of the carrying member 55. The receptacle 59 has an annular opening 61 through which the mount 3 with the shell 23 extends. The shell 23 also has an opening 63, which extends up to the location of the opening 61. After correct insertion of the mount 3 into the carrying member 55 an adhesive is applied in the opening 61, which flows around this opening and into the opening 63. In this way the mount 3 together with the screening shell 63 is firmly secured to the carrying member 55.

The stylus unit 65 comprises the stylus support 51 and a stylus holder 67. On a holder sleeve 69 which can be slid onto the shell 23 the stylus holder 67 carries a tubular portion 71 of square cross-section. This portion 71 receives an elastomeric suspension block 73 in which the stylus support 51 with the stylus 53 and the stylus magnet 75 are secured.

Figure 5:
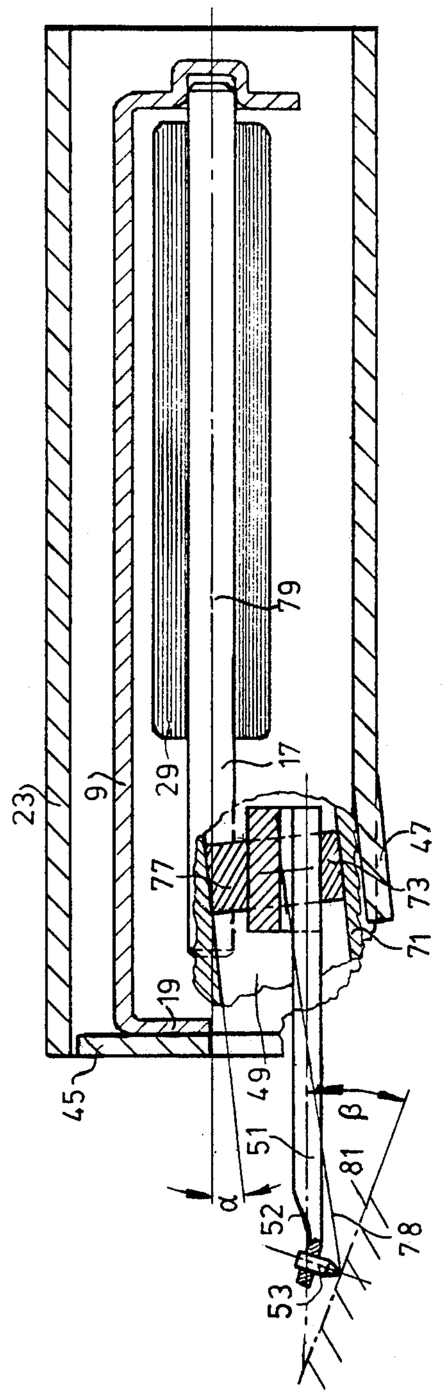
FIG. 5 shows an eccentric stylus suspension.

The tubular portion 71 is disposed at an angle $\alpha$ relative to the axis 79 of the pick-up head, represented by the pole piece 17, the flux-return member 9 and the screening shell 23 in FIG. 5. The angle $\alpha$ has been selected so that when the stylus 53 is placed on an information-carrier disc 81 the prescribed tracking angle $\beta$ is obtained. This enables the elastomeric suspension block 73 to be made axially symmetric, while maintaining the asymmetric arrangement in the electro-magnetic field gap 49 between the pole pieces 31 and 47 which provides an improved cross-talk attenuation.

The stylus holder 67 is fixed to the mount 3 by sliding it onto the screening shell 23 (also see FIG. 1 at the extreme left). Projections 77 on the inner side of the holder sleeve 69 firmly retain the sleeve 69 on the shell 23. When the stylus holder 67 has been slid on fully, the tubular portion 71 has moved the stylus support 53 into the gap 49 between the pole-pieces of the pole rods 17 and the surface 47 of the screening shell 23. The system is then ready for operation.

A protective cap 83 may be attached to the stylus holder 67, which can be slid over the stylus 53 with its diamond tip 79 in the same way as a visor.

Figure 6:
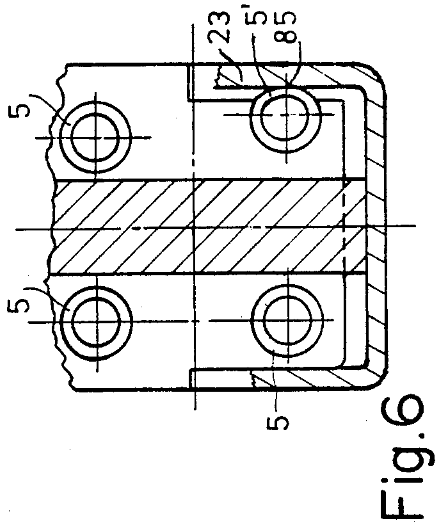
FIGS. 6 and 7 show a direct contact between a connector pin and the screening shell.
Figure 7:
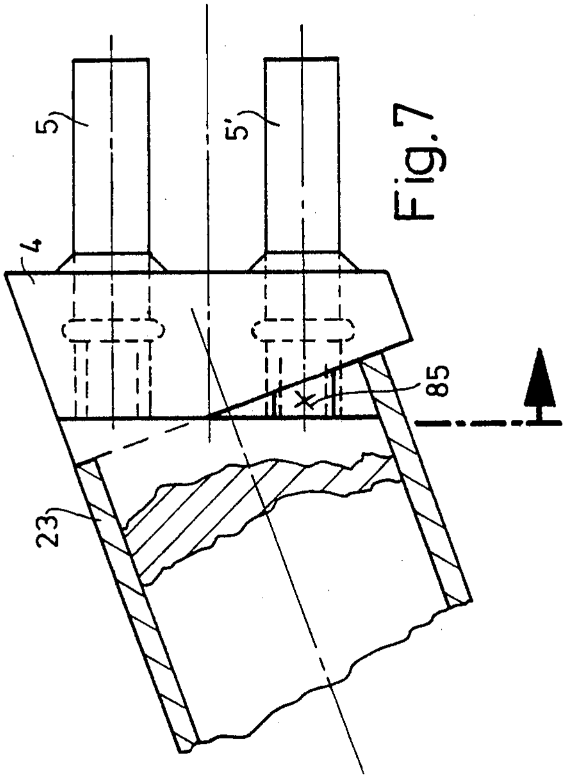

FIGS. 6 and 7 show a simple method of forming the earth contact with a connector pin 5'. This connector pin 5' is arranged at an outwardly offset location. This makes it possible to press the pin 5' onto the shell 23. At the location 85 a metallic contact is obtained with the screening cover 23 on the mount 3. Thus for obtaining the earth contact a wire connection and additional soldered joints may be dispensed with.

What is claimed is:

1. A pick-up head comprising:

a stylus unit including a stylus support and a stylus carried at one end of the support, a magnetic system for directing and sensing magnetic fields for cooperation with the stylus unit, comprising two coils and pole pieces, each arranged for sensing a respective one of two orthogonal directions of stylus oscillation, and a third pole piece common to said magnetic fields sensed for said two orthogonal directions of oscillation, and means for mounting said system and stylus unit, characterized in that said means for mounting comprises an elongate one-piece nonmagnetic plastic mount having two ends, and electrical connector pins provided at one of said two ends, said coils being elongated in the direction of the elongation of said mount and carried side by side within said mount, said system comprises two straight rods made of magnetic material, each of said rods having a rear end and a transducing gap end, and each rod having a respective one of said coils disposed around the rod with the ends of the rod protruding from the coil; an elongated flux return member having first and second bent limbs, said first limb being in magnetic contact with the rear ends of said straight rods; and an elongated tubular screening shell made of magnetic material and slid onto and around said mount, and said stylus unit includes a tubular holder sleeve which is removably slid onto said screening shell at an end opposite said one end of said mount, said screening shell having a shell surface disposed opposite the transducing gap ends of the straight rods, said shell surface constituting the third pole piece, said second bent limb of said flux return member being in magnetic contact with the screening shell.

2. A pick-up head as claimed in claim 1, characterized in that said mount includes at least one projection, a respective transducing gap end of a rod engaging said projection so as to urge the rear end of the rod against the first limb of the flux return member.

3. A pick-up head as claimed in claim 2, characterized in that said first limb comprises a recess, the rear end of one of said rods engaging said recess.

4. A pick-up head as claimed in claim 1 or any one of claims 1–3, characterized in that said mount comprises a stop disposed at said one of said ends, arranged to engage said screening shell when the shell is slid fully onto said mount.

5. A pick-up head as claimed in claim 4, comprising a carrying member arranged for attachment to a pick-up arm, characterised in that said carrying member comprises a receptacle and a stop for the mount.

6. A pick-up head as claimed in claim 5, characterized in that in an assembled position the screening shell, mount and carrying member are mutually secured to each other by an adhesive which contacts said shell, carrying member and mount.

7. A pick-up head as claimed in claim 1, comprising a carrying member arranged for attachment to a pick-up arm, characterised in that said carrying member comprises a receptacle and a stop for the mount.

8. A pick-up head as claimed in claim 7, characterized in that in an assembled position the screening shell, mount and carrying member are mutually secured to each other by an adhesive which contacts said shell, carrying member and mount.

9. A pick-up head comprising:

a plurality of magnetic components forming a magnetic system, said system including two coils, a respective pole piece associated with each coil, and a third pole piece, a stylus unit comprising a stylus, a support for the stylus, and a magnetic element connected to said stylus, said magnetic element cooperating with said plurality of magnetic components and said respective pole pieces being arranged with respect to said magnetic element such that each coil is associated with a respective one of two orthogonal directions of oscillation of the stylus for producing an electrical signal in the respective coil, and means for mounting said plurality of components and said stylus unit, characterized in that said means for mounting comprises an elongate one-piece nonmagnetic mount having two ends, and electrical connector pins provided at one of said ends, said coils being elongated in the direction of elongation of said mount and carried side by side within said mount, said plurality of components includes elongated tubular screening shell made of magnetic material, having a front bounding wall and walls extending in said direction of elongation and fitting snugly around said mount, whereby said shell can be slid onto said mount during manufacture, said pick-up head includes means for permanently retaining said shell on said mount, and said stylus unit includes a tubular holder sleeve which is removably slide onto and surrounds said screening shell at an end opposite said one end.

10. A pick-up head as claimed in claim 9, comprising a carrying member arranged for attachment to a pick-up arm, characterised in that said carrying member comprises a receptacle and a stop for the mount.

11. A pick-up head as claimed in claim 10, characterized in that in an assembled position the screening shell, mount and carrying member are mutually secured to each other by an adhesive which contacts said shell, carrying member and mount.

* * * * *